United States Patent [19]

Boillat

[11] Patent Number: 4,673,855
[45] Date of Patent: Jun. 16, 1987

[54] RESTRAINING THE INSTABILITY OF A STEPPER MOTOR

[75] Inventor: Pierre Boillat, Meyriez, Switzerland

[73] Assignee: Sodeco-Saia AG, Murten, Switzerland

[21] Appl. No.: 706,501

[22] Filed: Feb. 28, 1985

[30] Foreign Application Priority Data

Nov. 6, 1984 [CH] Switzerland ............... 05323/84

[51] Int. Cl.$^4$ ............................................... H02P 8/00
[52] U.S. Cl. .................................... 318/696; 318/685
[58] Field of Search ................. 318/696, 685; 307/265

[56] References Cited

U.S. PATENT DOCUMENTS

| | | | |
|---|---|---|---|
| 4,074,179 | 2/1978 | Kuo et al. | 318/696 |
| 4,091,316 | 5/1978 | Friedman | 318/696 |
| 4,119,901 | 10/1978 | Leenhouts | 318/685 |
| 4,330,751 | 5/1982 | Swain | 328/61 |
| 4,446,412 | 5/1984 | Friedman et al. | 318/696 |
| 4,455,520 | 6/1984 | Ward et al. | 318/696 |
| 4,540,928 | 9/1985 | Marhoefer | 318/696 |

FOREIGN PATENT DOCUMENTS 0036931 10/1981 European Pat. Off. .
117776 1/1975 Fed. Rep. of Germany .
2705758 10/1981 Fed. Rep. of Germany .

OTHER PUBLICATIONS

"Solid State Electronic Circuits for Engineering Technology", Anthony S. Manera, McGrow-HIll, 1973.
Landis & Gyr *Mitteilungen* 31, 1984, pp. 28-35.
Wetter, "Amortissement des Oscillations d'un moteur pas a pas", *SEV/VSE* 73, 1982, pp. 527-534.

Primary Examiner—William M. Shoop, Jr.
Assistant Examiner—Saul M. Bergmann
Attorney, Agent, or Firm—Marmorek, Guttman & Rubenstein

[57] ABSTRACT

In an apparatus and method for preventing instability of a stepper motor operated by a plurality of alternating currents of different respective phases and controlled by a sequence of control pulses, the control pulses defining an angular parameter of the stepper motor, the steps include determining the sum of the phase currents, transforming the sum of the phase currents into a voltage fluctuating about an average value, determining the average voltage, and thereafter feeding back the fluctuating voltage so as to angle-modulate said control pulses.

4 Claims, 10 Drawing Figures

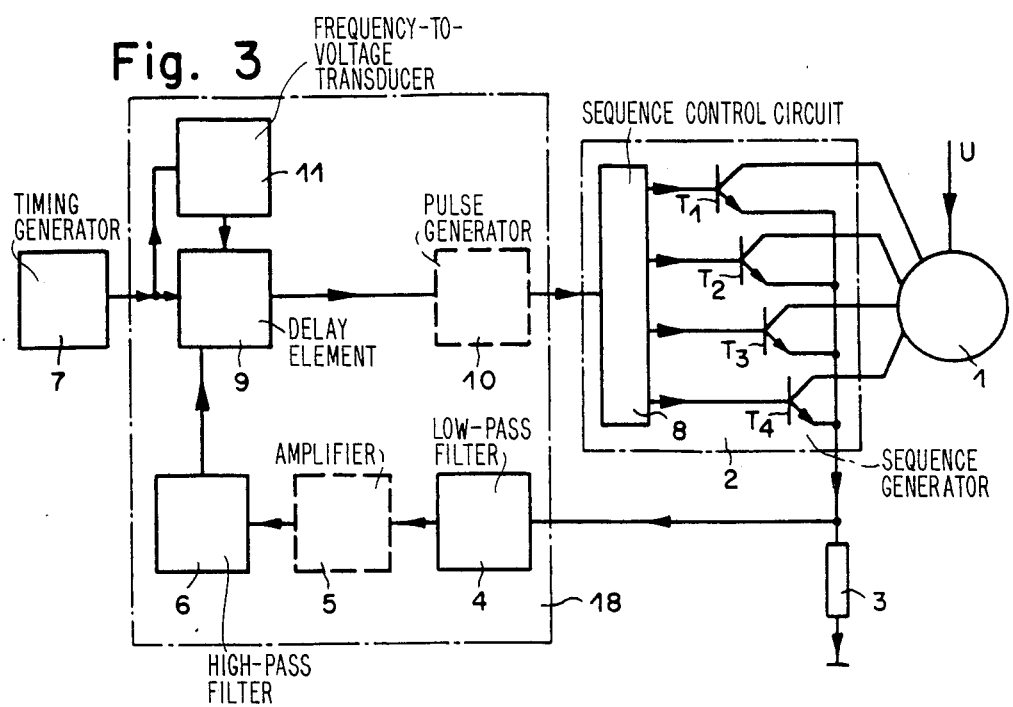
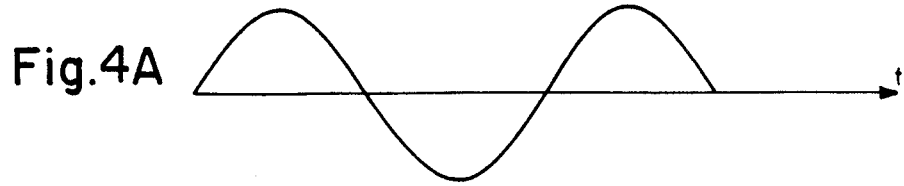
Fig.4A
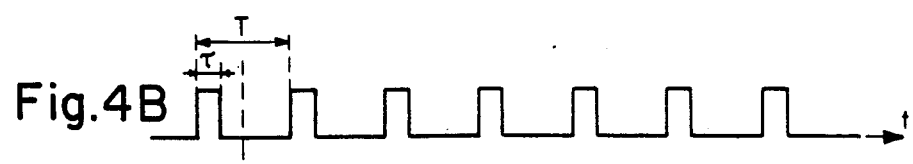
Fig.4B
Fig.4C
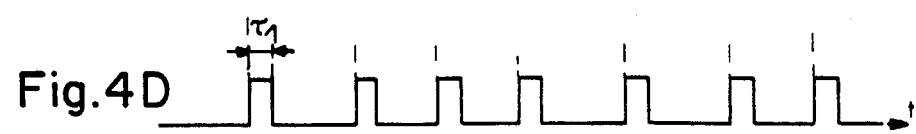
Fig.4D

RESTRAINING THE INSTABILITY OF A STEPPER MOTOR

BACKGROUND OF THE INVENTION

The invention relates to a method to cure the instability of a stepper motor and to a device to implement the method with the aid of a feedback signal which controls an angular parameter of control impulses of the stepping motor. Stepper motors are employed, for example, in printers, machines for generating drawings, floppy-drivers, hard disc-drivers and the like. From U.S. Pat. No. 4,091,316 there is known a method and a device to avoid oscillations and any loss of synchronism of stepper motors while using a tacho-alternator for providing an actual value, and a control circuit for regulation, namely modulation of the phase angle of the control impulses of the stepper motor.

SUMMARY OF THE INVENTION

It is an object of the invention to devise a method and implement the method which permits:

driving of single-phase or multi-phase stepping motors, and any of their coupling elements, without the employment of any sensors, such as, for example, Hall element sensors, induction coils, expensive tacho-alternators, mechanical or optical sensors, in a stable manner within their parametric resonance bands, and wherein the stabilization is relatively rapid and independent of any load and any dead time, namely easily tolerates load changes in the range from one to one hundred;

proper operation at an extremely large velocity range from zero to 35,000 revolutions per minute;

improvement of the output or effectivity of a stepper motor at a high output and so permit high mechanical effectivity;

operation independent of the type of sequence generator used, for example use of a constant voltage control, of a constant current control, of a chopper control of a bi-level control, or of a left/right control;

stabilization of the stepper motor both during uniform movements, as well as during accelerated movements;

cost at a price which has a reasonable relation to the cost of a stepper motor;

driving of two or of several stepper motors connected in parallel by means of a single stabilization device.

This makes it frequently possible to use smaller or less expensive stepper motors, and/or to utilize such stepper motors for purposes in which it has hitherto only been possible to use direct current motors for stable operation.

The stabilizing device should, if possible, be so implemented, that it can be used as an interface circuit between constructional elements of a control device of a stepper motor which are already available, without the control device having to be modified to a large extent.

This object is attained by an apparatus and a method for preventing instability of a stepper motor operated by a plurality of alternating currents of different respective phases, and controlled by a sequence of control pulses, the control pulses defining an angular parameter of the stepper motor, which includes determining the sum of the phase currents, transforming the sum of the phase currents into a voltage fluctuating about an average value, and thereafter feeding back the fluctuating voltage so as to angle-modulate said control pulses.

BRIEF DESCRIPTION OF THE DRAWING.

For a fuller understanding of the nature and objects of the invention, reference should be had to the following detailed description, taken in connection with the accompanying drawings, in which:

FIG. 3 is a block schematic diagram of a third version of such a device;

FIG. 4A through 4D are characteristic lines of different respective control signals of a stepper motor as s function of time, when using phase modulation;

The same reference numerals denote idential parts in all FIGS. of the drawing.

DESCRIPTION OF THE PREFERRED EMBODIMENTS.

Figure 1:
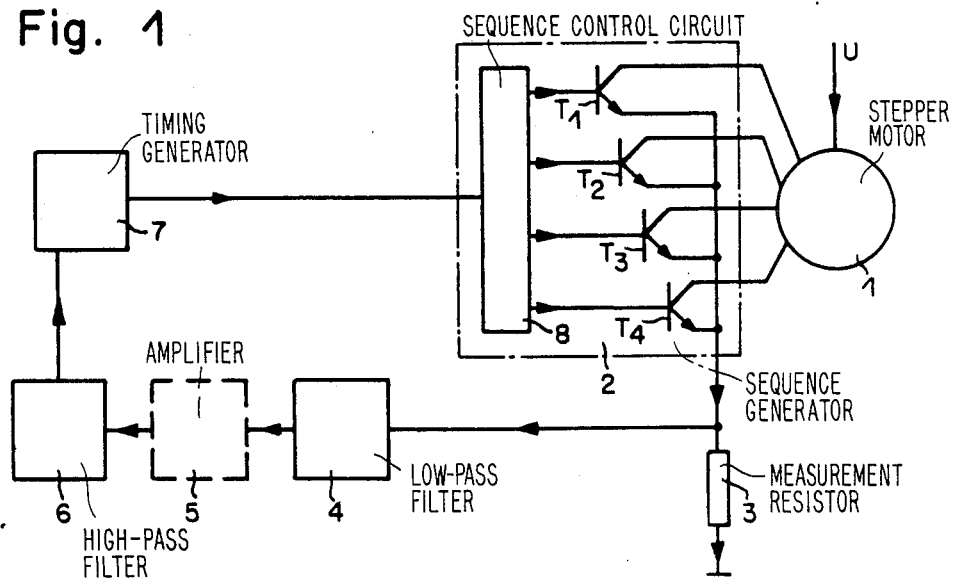
FIG. 1 is a block schematic diagram of a first version of the device to avoid instability of a stepper motor.
Figure 2:
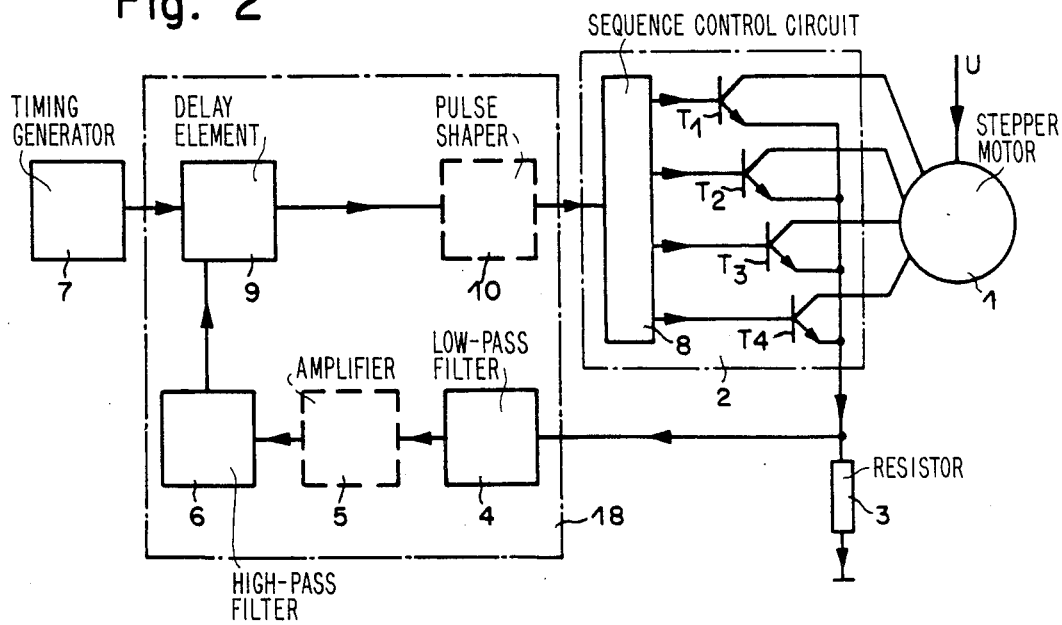
FIG. 2 is a block schematic diagram of a second version of such a device.

Referring now to the drawing, each device shown in FIGS. 1-3 shows at least:

A stepper motor 1, fed by a source of D.C. voltage U;
A sequence generator 2;
A measurement resistor 3;
A low-pass filter 4;
Optionally an amplifier 5;
A high-pass filter 6; and
A pulse or timing generator 7.

Components which are only optinally present are shown dotted in FIGS. 1-3.

The stepper motor 1 has an arbitrary number of phases. In the drawings the presence of a four-phase stepper motor 1 has been assumed. In that case the sequence generator 2 has four outputs connected to the stepper motor 1, which are, for example, open collector outputs. In that case the output driver of the sequence generator 2 consists in the case illustrated of four bipolar transistors T1, T2, T3 and T4, whose collectors, in turn, form the four outputs of the sequence generator 2, and whose base connections are connected to the four respective outputs of a sequence control circuit 8; the input of the sequence control circuit 8 is also the input of the sequence generator 2. The emitters of the four bipolar transistors T1, T2, T3, and T4 are, for example, connected within the sequence generator 2 with one another. Such sequence generators are known per se and are obtainable in commerce.

The terminal of the D.C. voltage U, which is not connected to the stepper motor 1 is not illustrated, but is, for example, connected to ground. In that case a first terminal of the measurement resistor 3 is also connected to ground.

All devices which are illustrated in FIGS. 1-3 are connected to one another in a unipolar manner:

The emitters of the bipolar transistors T1, T2, T3 and T4 are connected with the second terminal of the measurement resistor 3, and with the input of the low-pass filter 4;

The output of the low-pass filter 4 is connected with the input of the amplifier 5, or if the input to the amplifier 5 is not available, are connected with the input of the high-pass filter 6; and The output of the amplifier 5, if available, is connected with the input of the high-pass filter 6.

In the version shown in FIG. 1, the following are further connected to one another in a unipolar manner:

The output of the high-pass filter 6 is connected with a voltage controlled input of the tact or timing generator 7; and The output of the timing generator 7 is connected with the input of the sequence generator 2.

In the version shown in FIG. 2 there are additionally present:

A controllable delay element 9; and

Optionally an impulse former or pulse shaper 10; and wherein the following elements are connected to one another in a unipolar manner:

The output of the high-pass filter 6 is connected with a control input of the delay element 9;

The output of the tact or timing generator 7 is connected with the input of the delay element 9;

The output of the delay element 9 is connected with the input of the impulse former or pulse shaper 10, or, in the event the impulse former 10 is not available, the output of the delay element 9 is connected with the input of the sequence generator 2; and The output of the impulse former or pulse shaper 10, if it is available, is connected with the input of the sequence generator 2.

In the version shown in FIG. 3, in addition to the version shown in FIG. 2, there is present a frequency/voltage transducer 11, and wherein the following are additionally connected with one another:

The output of the tact or timing generator 7 is connected with the input of the frequency/voltage transducer 11; and The output of the frequency/voltage transducer 11 is connected to a further control input of the delay element 9. The pulse of timing generator required inversions 2 and 3 (see FIGS. 2 and 3) is a simple generator of rectangular pulses, for example an astable multivibrator, while the pulse generator used in the version of FIG. 1 is required to be a voltage-controlled generator of rectangular pulses, for example, an astable multivibrator constructed by means of a timer of the type LM 556. The timer of the type LM 556 is, for example, obtainable from National Semiconductor Corp. 2900 Semiconductor Drive, Santa Clara, California 95051, and is described in their "Lineardata book" 1978, as well as in their "Linear applications Handbook" 1978.

The high-pass filter 6 and the low-pass filter 4 are, for example, known L-RC elements, and wherein in the high-pass filter 6 there is arranged a capacitor in the longitudinal branch, and a resistor in the transverse branch; however in the low-pass filter 4, in a reverse manner, the capacitor is arranged in the transverse branch, and the resistor in the longitudinal branch. In the simplest case the high-pass filter 6 consists only of a capacitor, and wherein a terminal of this capacitor forms the input of the high-pass filter 6, while the other terminal of the capacitor forms an output of the high-pass filter 6. In the event the amplifier 5 is not available, the high-pass filter 6 can be combined with the low-pass filter 4 so as to be connected in series, and thus form only a single bandpass filter.

Figure 6:
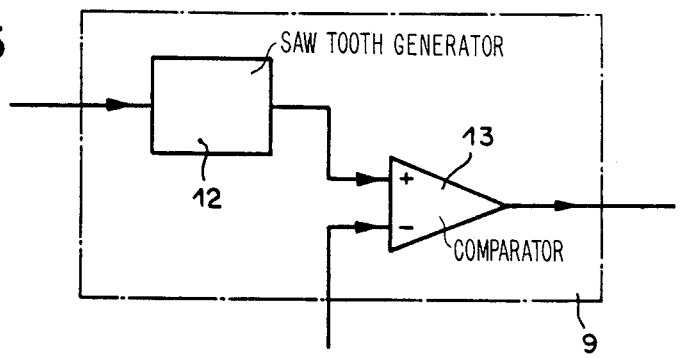
FIG. 6 is a block schematic diagram of a controllable delay element having an analog comparator.
Figure 7:
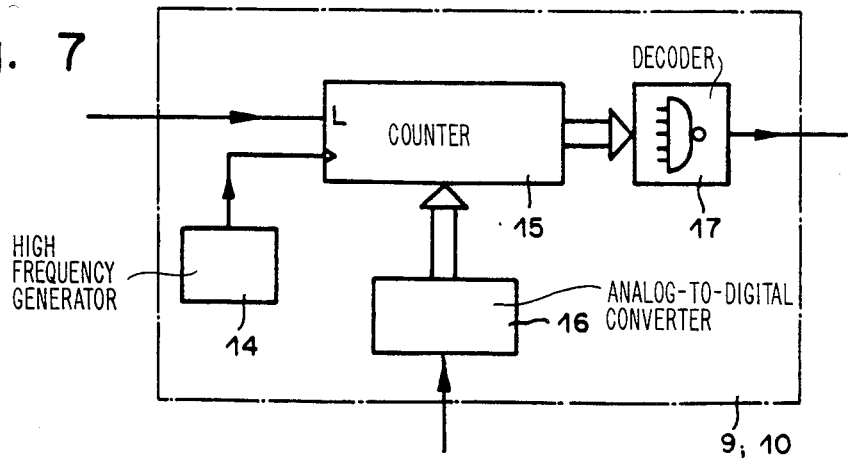
FIG. 7 is a block schematic diagram of a combination of a controllable delay element and of a pulse shaper having a synchronous digital circuit.

The controllable delay element 9 (see FIGS. 2 and 3) is, for example, a monostable multivibrator, which is constructed by means of a timer of the type LM 556. But it can also be constructed as shown in FIGS. 6 and 7. The impulse former or pulse shaper 10, which is, for example, a known monostable multivibrator controlled by negative going edges, and which is available in commerce, is only required if the sequence generator 2 is impulse-controlled. If the sequence generator 2 is, however, controlled by pulse edges or if the circuit shown in FIG. 7 is used, then the impulse former or pulse shaper 10 can be omitted. The frequency/voltage transducer 11 (see FIG. 3) can, for example, be constructed with the aid of a timer of the type LM 122 of the National Semiconductor Corp., which is also described in the already stated publications.

FIG. 4A represents the characteristic line of the alternating voltage portion of the average value of the sum of all phase currents of a stepper motor 1 as a function of time. For simplicity's sake it was shown in FIG. 4A as a sinusoidal curve.

FIG. 4B represents the characteristic line of the output signal of the pulse or timing generator 7 as a function of time. It consists of a sequence of rectangular impulses of a duration $\tau$ and has a period $T=1/f$, wherein f is the tact or timing frequency. T is, for example, equal to 1 ms.

FIG. 4C is a characteristic line of the output signal of the delay element 9 as a function of time. It consists of a sequence or rectangular impulse-duration modulated impulses having a period T. $T_1$ is the delay time of the delay element 9, if the alternating voltage part of the average value of the sum of the phase currents namely the modulation, is equal to zero.

FIG. 4D represents the characteristic line of the output signal of the impulse former or pulse shaper 10 as a function of time. It consist of a sequence of rectangular impulses having a duration $\tau$, whose positive-going edges coincide in time with the negative-going edges of the impulse shown in FIG. 4C.

Advantageously the value of the delay time $T_1$ of the delay element 9 is selected at zero modulation, namely at the zero value of the error-correction signal at the output of the high-pass filter in FIGS. 2 and 3 in such a manner, so that the impulses shown in FIG. 4D, or the negative-going edges of the impulses shown in FIG. 4C lie time-wise approximately in the center between two consecutive impulses of the output signal of the tact or timing generator shown in FIG. 4B; this means that $T_1$ is selected to be approxaimately equal to T/2. The impulse duration $\tau$ and the impulse duration $\tau_1$ are selected to be significantly smaller than the delay time $T_1$.

Figure 5:
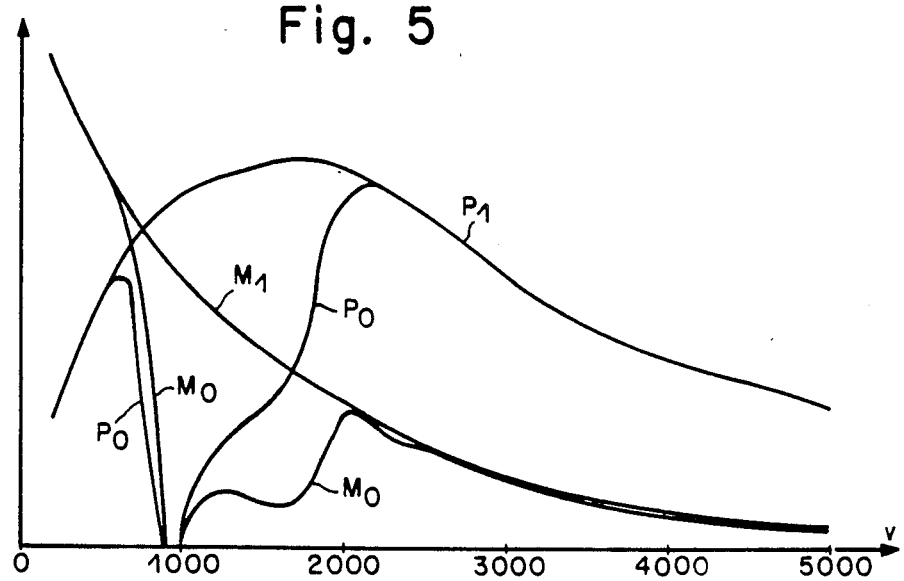
FIG. 5 are characteristic lines of the torque and of the mechanical output of a stepper motor as a function of the stepping velocity, both when stabilization is present, and when it is not present.

In FIG. 5 there are shown four characteristic lines $M_0$, $M_1$, $P_0$ and $P_1$ as a function of the step velocity of the stepper motor 1. The characteristic line $M_0$ represents the torque of a stepper motor 1 without any stabilization, $M_1$ represents the torque in the presence of stabilization, $P_0$ represents the mechanical output of the stepper motor 1 without any stabilization, and $P_1$ its output in the presence of stabilization.

The characteristic torque line $M_0$ suffers a collapse of torque, for example at a velocity of about 1000 steps per second, and the output characteristic line $P_0$ has a maximum value below 1000 steps per second, which is significantly smaller than the maximal value of the output characteristic line $P_1$, which lies above 1000 steps per second. The characteristic line $M_1$ of the torque decreases continuously without any collapse with an increasing step velocity v.

The controllable delay element 9 shown in FIG. 6 consists of a saw tooth generator 12 and an analog comparator 13, whose minus input forms a control input, and whose output forms the output of the delay element 9. The output of the saw tooth generator 12 is connected with the plus input of the comparator 13, and its input forms the input of the delay element 9.

The combination 9;10 of a delay element and of a pulse shaper shown in FIG. 7 consists of a high-frequency pulse generator 14, a counter 15, analog-to-digital converter or transducer 16, and a decoder 17; the output of the decoder 17 forms the output of the combination 9;10. The control input of the delay element 9 controlled by the high-pass filter 6 according to FIG. 2 or FIG. 3 is equal to the control input of the combination 9; 10 and is formed by the analog input of the analog/digital transducer 16; the digital output of the analog/digital transducer 16 is connected with the aid of a bus connection with the parallel input of the counter 15. The output of the high frequency tact generator 14 is connected to the timing input of the counter 15, whose load input forms the input of the combination 9; 10; that input is controlled, according to FIG. 2 or FIG. 3, by the timing generator 7. The parallel output of the counter 15 is connected through a further bus connection with the input of the decoder 17, which, for example, consists of a NAND gate, which has as many inputs as the binary counter 15 has parallel outputs. The counter 15 may also be a binary counter or a decade counter.

Operation

Abrupt losses of torque occur in stepper motors within a region of high velocities at certain critical frequency regions. The stepper motor may fall out of synchronism and may stop. This behavior can be explained by parametric resonances of the stepper motor, as a rotor of the stepper motor, in addition to rotating at a constant angular velocity, executes oscillations; the amplitudes of these oscilations increase severely in these critical frequency regions and may become so severe, that the stepper motor loses its synchronism and stops.

The stepper motor is characterized by its torque. In the absence of any stabilization its torque characteristic line within the frequency region from 0 to 20 kH₀ theoretically suffers several collapses; in practice, however, it suffers at least one collapse, which occurs at approximately at 1000 steps per second, as is shown in FIG. 5 by the characteristic line $M_0$ (the so-called "pull out" region). This results in the stepper motor being able to be driven in the absence of any stabilization only at a low velocity, for example below a 1000 steps per second, namely in a velocity region in which its mechanical output according to the characteristic line $P_0$ of FIG. 5 is relatively low, and its power and efficiency is poor.

Proposals for stabilizing of a stepper motor which requires sensors or couplings cannot be used, as a rule for reasons of price and/or space utilization. A tacho-alternator, for example, costs a multiple of the price of a low cost stepper motor, for example that of a "tin can" stepper motor. Furthermore, as a rule no space is available for space-consuming couplings. In the inventive device the stepper motor itself is used as a sensor for determining an actual value, and therefore for determining an error correction signal of a control circuit. It is not the deviation of the velocity from a desired velocity, which is used as an error-correcting signal, as is the case in the state of the art, but the oscillations of the load angle about its nominal load angle are used as an error-correction signal. This has, inter alia, the advantage that the stabilization of the stepper motor is independent of any load.

During stable operation of the stepper motor, and at a given load the envelope of its phase current, and therefore also its average value is approximately constant. During unstable operation, however, oscillations of the envelope curve result, and consequently also of the average value of the phase current, which are a measure for the oscillation of the load angle around its nominal value.

In all three versions shown in FIGS. 1-3 the instability of a stepper motor 1 is avoided with the aid of a feedback signal, which modulates an angular parameter of the control impulses of the stepper motor 1, by the algebraic sum current of the phase current of the stepper motor 1 being continuously determined with the aid of the measuring resistor 3 and transformed into a proportional voltage whose average value is then generated with the aid of the low-pass filter 4. As the individual phase currents of the stepper motor 1 occur timewise approximately sequentially, the voltage across the measuring resistor 3 is approximately proportional to the instantaneously passing phase current of the stepper motor 1, while the oscillations of the average value obtained with the aid of the low-pass filter 4 are a measure for the oscillations of the load angle of the stepper motor 1. The fluctuations of this average value, which may have a frequency from 0 to 400 Hz, are independent of the average value, and therefore also independent of the nominal load angle. An advantage of the use of fluctuations of this average value as an error-correction signal lies therein, that it reaches its maximal value shortly before the stepper motor 1 reaches its critical point, namely before the stepper motor 1 loses synchronism; at that time the load angle is maximal. This is in contrast to the state of the art, based on velocity, where the actual velocity value at that moment in time is equal to $\omega 0 = 2\pi SPS/SPR$, where SPS=step per sec. and SPR=step per revolution, therefore giving no error signal.

The value of the output signal of the low-pass signal 4 depends in all three versions on the value of the measurement resistor 3, and on the value of the phase currents. It is, as a rule, 100 to 1000 times smaller than the D.C. voltage U, which feeds the stepper motor 1. If the value of the output voltage of the low-pass filter 4 is insufficient to drive the following control circuit, then an amplifier 5 is interconnected between the low-pass filter 4 and the high-pass filter 6. The amplifier 5 is an alternating-current amplifier, and amplifies the alternating voltage portion, namely the fluctuations of the average value, or, in the versions 2 and 3, the fluctuations of a phase-displaced average value, before these fluctuations modulate the control impluses of the stepper motor 1.

The following high-pass filter 6 eliminates, in the absence of an amplifier 5, the D.C. voltage component of the average value, and in the presence of the amplifier 5, its output "offset voltage, so that in any case, only the possibly amplified fluctuations of the average value are determined, which subsequently reach the voltage control input of the timing generator 7 (see FIG. 1), or the control input of the delay element 9 (see FIGS. 2 and 3), so that the control impulses of the stepper motor 1 are angle modulated.

In the first version shown in FIG. 1, the modulated angular parameter is the frequency of the control impulses. The alternating current portion of the optionally amplified average value changes in this version the frequency of the rectangular pulse signals generated by the timing generator 5 continuously, so that the following sequence generator 2 is fed with frequency-modulated rectangular impulses. The low-pass filter 4 and the high-pass filter 6 generate per se a small phase displacement of the alternating voltage portion of the average value. In the version 1 both those filters are, however, dimensioned in a known manner in such a way that any phase displacement generated by them are as small as possible, so that the alternating voltage portion of the average value frequency-modulates the control impulses generated by the timing generator 7, and subsequently by the sequence generator 2, without any additional phase displacement occurring. Shortly before the stepper motor 1 reaches its critical point, the effect of the frequency modulation on the control impulses generated by the sequence generator 2 of the stepper motor 1 is largest, so that the corrective effect of the control circuit is also maximal, and therefore counteracts most strongly any loss of synchronism of the stepper motor 1, as far as regulatory control is concerned.

In the versions 2 and 3 shown in FIGS. 2 and 3 the modulated angular parameter represents the phase of the control impulses. In these versions the control impulses of the stepper motor 1 generated by the sequence generator 2 are phase modulated. As it is well known that a frequency is proportional to $d\phi/dt$, wherein $\phi$ is a phase, and as it is known that the derivative causes a phase rotation of 90 degrees, the average value, according to FIG. 1, must be additionally phase-shifted by 90 degrees when phase modulation is used, namely in versions 2 and 3, before its fluctuations phase modulate the control impulses of the stepper motor 1. This is accomplished in a simple and elegant manner, by the phase displacement caused by the low-pass filter 4 being selected by means of dimensioning of the low-pass filter 4, —which is known per se, —being not made as small as possible, but being made as equal to 90 degrees as possible. The error-correction signal at the output of the high-pass filter 6 then has the required phase position needed for the phase modulation. The error-correction signal then shifts the delay times generated by the delay element 9 (see FIG. 4C), namely the impulse duration of its monostable multivibrator, so that, for example, all positive-going edges of the rectangular impulses generated by the timing generator 7 (see FIG. 4B) appear delay-phase modulated as negative-going edges at the output of the delay element 9 (see FIG. 4C). If the following sequence generator 2 is only edge-controlled, then the output signal of the delay element 9 can control the sequence generator 2 directly. Otherwise, the negative-going edges of the output signal of the delay element 9 must be conditioned with the aid of the pulse shaper 10, and be transformed into impulses, before they can be fed to the following sequence generator 2. The pulse shaper 10 therefore associates each negative-going edge of its input signal with an impulse of constant duration $\tau_1$ (see FIG. 4D).

So as to obtain a maximal control both in a positive and in a negative phase direction, the delay time $T_1$ of the delay element 9 is so selected, that in the case of an error-correction signal zero at the output of the high-pass filter 6 and controlling, for example, negative-going edges at the output of the delay element 9 occur time-wise approximately in the center between two consecutive output impulses of the timing generator 7. So as to always automatically obtain this effect at variable control frequencies of the stepper motor 1, namely at variable frequencies of the timing generator 7, the average value of the delay time of the delay element 9, namely the delay time $T_1$, is adjusted to a time-wise approximately center position between two succeeding output pulses of the timing generator 7 at a zero value of the error-correction signal in the version 3 (see FIG. 3) with the aid of the output signal of the frequency/voltage transducer 11. The output signal of the frequency/voltage transducer 11 is proportional to the frequency of the output signal of the timing generator 7, and therefore inversely proportional of the timing generator 7, and therefore inversely proportional to its period T, namely to the distance between two consecutive output pulses of the timing generator 7 (see FIG. 4B).

The versions 2 and 3 shown in FIGS. 2 and 3, respectively, have the advantage that the timing generator 7 need not be voltage-controlled. A timing generator 7 not controlled by any voltage, as well as a sequence generator 2, and a measurement resistor 3 are, as a rule, already present when stepper motors are used, so that in this case the use of one of the two versions 2 and 3 has the advantage that only a simple interface circuit 18 need be connected between the already available timing generator 3 and the also already available combination 2;3 of the sequence generator 2 and of the measurement resistor 3, so as to remedy the instability of the stepper motor 1 during operation. This interface circuit 18 consists, in the case of version 2, (see FIG. 2) of a low-pass filter 4, optionally of an amplifier 5, of a high-pass filter 6, of a delay element 9, and optionally of the pulse shaper 10. In the case of the version 3 (see FIG. 3) optionally the frequency/voltage transducer 11 could be added.

The delay element 9 shown in FIG. 6 operates as follows: the saw-tooth generator 12 transforms the rectangular output pulses of the timing generator 7 into saw-tooth impulses, which change the state of the analog comparator 13, whenever their value reaches the value of the error-correction signal available at the control input of the delay element 9. The duration of the rectangular impulses appearing at the output of the comparator 13 is therefore proportional to the error-correction signal and is therefore impulse modulated thereby exactly as is the case in the controllable monostable multivibrator.

In the analog-to-digital transducer 16 of the circuit 9;10 shown in FIG. 7 the analog error-correction signal supplied by the high-pass filter 6 is changed into a digital value, and this value is loaded by each output impulse of the timing generator 7, which appears at the input of the circuit 9;10, into the counter 15. The counter 15 then counts, starting from this digital value, backwards the output pulses of the high-frequency pulse generator 14. As soon as the count value reaches the value zero, there appears at the output of the NAND gate, forming the decoder 17, a short impulse for the duration of the output impulse of the high-frequency pulse generator 14, whose timing position, in turn, is proportional to the digital value loaded into the counter 15, and is consequently proportional to the error correction signal. The output pulses of the circuit 9;10 are therefore phase modulated by this error correction signal. A pulse shaper 10 is not required in this case, as the conditioned pulses are automatically generated by the circuit 9;10.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. In an apparatus for preventing instability of a stepper motor operated by a plurality of alternating currents of different respective phases and controlled by a sequence of control pulses, said control pulses defining an angular parameter of the stepper motor, the improvement comprising a timing generator for producing a pulse signal, a combined controllable delay element and pulse generator connected to the output of said timing generator, and operable to pulse time modulate said pulse signal, a sequence generator connected to the output of said combined controllable delay element and pulse generator, said sequence generator generating said control pulses, said control pulses controlling said stepper motor, a resistor connected to an output of said sequence generator for providing the sum of said phase currents, and for transforming said sum into a voltage fluctuating about an average value, a low-pass filter connected to said resistor for receiving said voltage, and for determining said average value with a substantially 90° phase shift, and a high-pass filter connected to an inut of said combined delay element and pulse generator for providing fluctuations about said average value to said combined delay element and pulse generator for pulse time modulating said pulse signal, said combined delay element and pulse generator including a counter, a high frequency pulse generator connected to an input of said counter, an analog-to-digital converter having an output thereof connected to another input of said counter, and a decoder having an input thereof connected to an output of said counter.

2. The apparatus as claimed in claim 1, wherein said decoder includes a NAND gate.

3. The apparatus as claimed in claim 1, further including an amplifier having an input thereof connected to an output of said low-pass filter, and having an output thereof connected to an input of said high-pass filter.

4. The apparatus as claimed in claim 1, wherein said low-pass filter and said high-pass filter are connected to one another so as form a band-pass filter.

* * * * *